(No Model.)

J. REILLY.
HYDROCARBON BURNER.

No. 315,549. Patented Apr. 14, 1885.

WITNESSES
Edward Wolff
Chas. B. Gill

INVENTOR
James Reilly

UNITED STATES PATENT OFFICE.

JAMES REILLY, OF BROOKLYN, NEW YORK.

HYDROCARBON-BURNER.

SPECIFICATION forming part of Letters Patent No. 315,549, dated April 14, 1885.

Application filed December 20, 1884. (No model.)

*To all whom it may concern:*

Be it known that I, JAMES REILLY, a citizen of the United States, and a resident of Brooklyn, in the county of Kings and State of New York, have invented certain new and useful Improvements in Hydrocarbon-Burners, of which the following is a specification.

The invention relates to improvements in hydrocarbon-burners; and it consists in the elements hereinafter described, and particularly pointed out in the claims.

Figure 1:
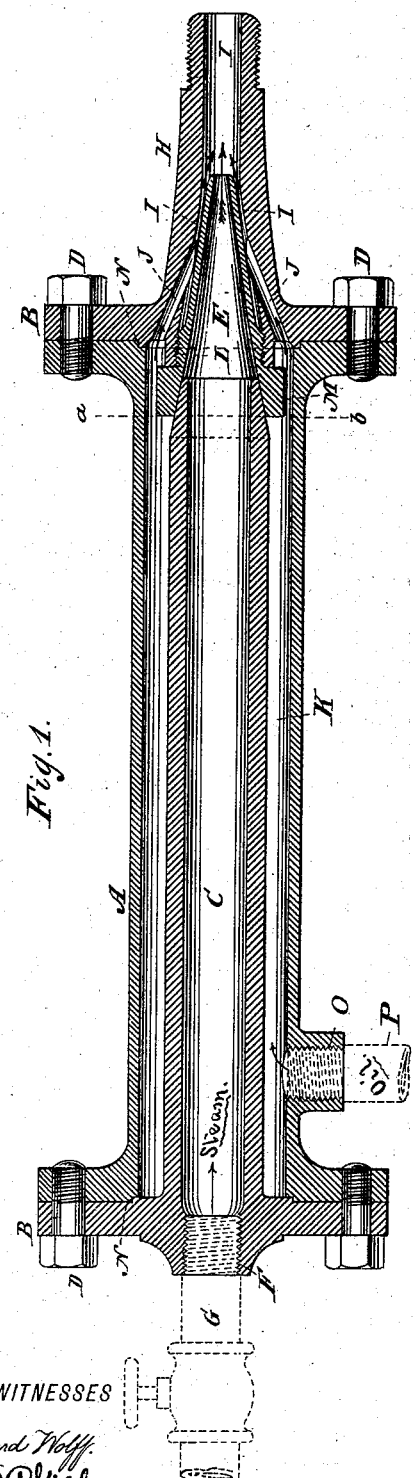
Figure 3:
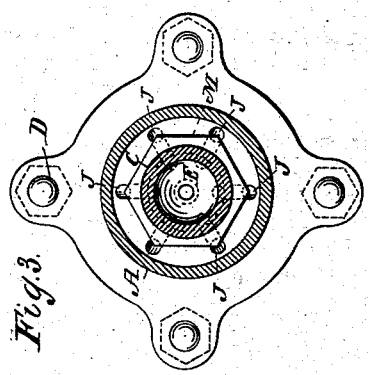
Figure 4:
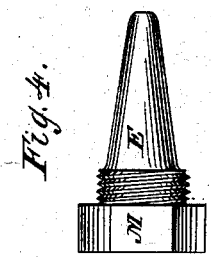
Figure 2:
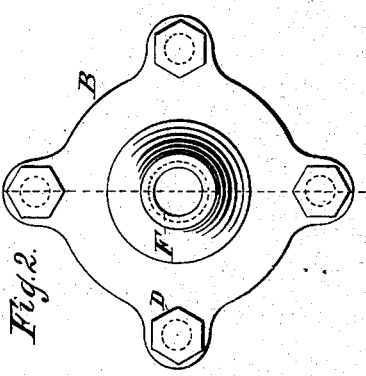

Referring to the accompanying drawings, in which like letters of reference indicate corresponding parts, Figure 1 is a central vertical longitudinal section of an apparatus embodying the elements of the invention. Fig. 2 is a front end view of the same. Fig. 3 is a vertical transverse section on the line *a b* of Fig. 1, and Fig. 4 is a side elevation of the hollow cone E detached from the other parts of the burner.

In the drawings, A denotes the outer shell or casing of the burner, having at each end heads B, and inclosing a central steam tube or pipe, C. The heads B are secured in place by bolts D, the head at the rear end of the casing A being supplied with a threaded aperture, F, to receive the end of a steam-pipe, G, as indicated in Fig. 1. The head B at the front end of the casing A is also secured in place by bolts D, and provided with the central extension, H, containing an interior passage, I, and adapted to receive upon its extremity a nozzle of any desired outline, according to the character of the flame to be produced.

The steam tube or pipe C will preferably be cast with the head B at the rear end of the casing A, and the front end of said tube will be beveled upon its outer edges, the interior of the tube, however, being of equal diameter throughout.

In the head B at the front end of the casing A are formed the apertures J, arranged in a circle around its central opening, I, and inclining from a point adjacent to the circumference of the chamber K (formed between the tube C and casing A) to the exterior walls of cone E, as indicated in Fig. 1, the outlet of the apertures J being in rear of the forward extremity of the cone E. The cone E fits within the inner portions of the passage I in the front head B, and is retained in place by a thread, L, which engages a corresponding thread cut in the interior of the inner end of passage I. The inner end of the cone E is provided with a nut, N, and the cone contains a gradually-tapering central bore passing from the inner end of the nut N to its forward extremity. The front end of the tube or steam-pipe C fits within the inner bore of the cone E, forming a steam-tight joint.

Upon the inner face of the heads B are formed annular shoulders N, which, when the heads are placed in position, enter corresponding grooves formed on the outer face of the ends of casing A, whereby the heads may be secured to the casing in a steam-tight manner, and the tube C and apertures J brought into proper relation with the oil-chamber K without difficulty or delay in arranging the parts of the burner. The casing A is provided, preferably at its rear portion, with a nozzle, O, to which a pipe, P, may be attached, the said pipe leading from a suitable oil-supply.

In the operation of the invention the steam is first permitted to enter and pass through the steam tube or pipe C and away through the outlet I, the effect of the steam being to heat the burner and to draw the air from the chamber K and apertures J, thereby creating a vacuum in the chamber K and drawing the oil through the pipe P into said chamber K. The oil in the chamber K will become liquefied and partially volatilized, owing to the action of heat, and will be drawn through the apertures J, down the exterior walls of the cone E, and driven out through the passage I with the steam, the latter serving both to heat the burner and to keep the volatilized oil moving from the passage I. The oil-pipe P being at the rear end of casing A permits the oil to flow over a large heated surface in the chamber K before it is discharged therefrom, and hence when it reaches the apertures J it will be superheated, and the steam will readily and regularly draw the desired proportionate quantity through the passage I. It should be noted that the oil-pipe P is at the lower side of the casing A, and that the oil will have no flow in said casing except as it is moved therein by the vacuum created by the moving body of steam, and hence only such quantity of oil will escape through the apertures J and passage I as may be fully combined with the steam and consumed.

My experiments and the practical use of the burner have fully demonstrated the fact that all of the oil which is allowed to pass through the apertures J will be consumed, no portion of the same being sprayed beyond the action of the steam. The outer end of the steam pipe or tube C being beveled and ground into the inner end of the cone E is advantageous, in that any contraction or expansion of the parts of the burner will be compensated for, the joint remaining steam-tight; but it must be understood that I do not limit myself to a ground joint at the point where the front end of the pipe C and cone E meet, since the essential consideration is merely to make a joint which will prevent the escape of steam into the oil-chamber around the pipe C.

In the patent to H. Napier, dated February 8, 1876, is shown a hydrocarbon-burner having a sliding cone, through which the steam passes, and down the exterior surface of which the oil is led from apertures connecting with an oil-supply. I do not, therefore, claim this feature herein; but

What I claim as my invention, and desire to secure by Letters Patent, is—

1. The casing A, closed at its ends by heads B and containing a central steam-pipe, C, combined with the extension H, passage I, series of apertures J in the head B, and hollow cone E, the inner end of the cone being upon the front end of pipe C, substantially as set forth.

2. In a hydrocarbon-burner, the casing A, heads B, having shoulders N, which enter corresponding recesses in the ends of the casing, and steam-pipe C, passing centrally through the casing A and forming a chamber, K, in combination with the hollow cone E, communicating with the steam-pipe C, the series of apertures J, passing from the chamber K to the outer walls of cone E, the extension H, and passage I, substantially as set forth.

Signed at New York, in the county of New York and State of New York, this 19th day of December, A. D. 1884.

JAMES REILLY.

Witnesses:
CHAS. C. GILL,
HERMAN GUSTOW.